US007478851B2

(12) United States Patent
Geller

(10) Patent No.: US 7,478,851 B2
(45) Date of Patent: Jan. 20, 2009

(54) VEHICLE HAND TOOL

(76) Inventor: Kenneth Geller, 1001 City Ave., Wynnewood, PA (US) 19096

( * ) Notice: Subject to any disclaimer, the term of this patent is extended or adjusted under 35 U.S.C. 154(b) by 299 days.

(21) Appl. No.: 11/428,630

(22) Filed: Jul. 5, 2006

(65) Prior Publication Data

US 2008/0007073 A1 Jan. 10, 2008

(51) Int. Cl.
*B25J 1/02* (2006.01)

(52) U.S. Cl. .......................... 294/19.1; 294/24; 294/26; 16/413; 81/15.9

(58) Field of Classification Search .................. 294/1.1, 294/19.1, 24, 26; 81/15.9; 16/413, 426, 16/427
See application file for complete search history.

(56) References Cited

U.S. PATENT DOCUMENTS 2,141,659 A 12/1938 Nehls
2,245,899 A 6/1941 Campbell
2,260,785 A 10/1941 Miguel
2,610,084 A 9/1952 Anderson
2,677,573 A 5/1954 Anderson
3,764,175 A * 10/1973 Yavitch ........................ 81/484
4,626,016 A 12/1986 Bergsten
4,726,263 A * 2/1988 Lake ........................... 81/15.9
4,788,893 A * 12/1988 Sutton ......................... 81/15.9
4,932,699 A * 6/1990 Hobson ...................... 294/19.1
5,197,357 A * 3/1993 Cote ........................... 81/15.9
5,555,779 A * 9/1996 Holden ........................ 81/15.9
5,855,408 A 1/1999 Rickabus
5,910,077 A 6/1999 Aumiller et al.
6,340,189 B1 1/2002 Pordy
6,533,346 B2 3/2003 Yu
6,584,643 B1 7/2003 Tomaiuolo

* cited by examiner

*Primary Examiner*—Dean J Kramer
(74) *Attorney, Agent, or Firm*—Panitch Schwarze Belisario & Nadel LLP

(57) ABSTRACT

A vehicle hand tool and method of use for opening and closing a vehicle door and performing various additional functions. The hand tool includes a hand gripper, a first rod and a second rod. The first rod includes a first end and a second end and the first end is fixed to the hand gripper. The second rod includes a third end and a fourth end and is movably mounted to the first rod. The second rod is movable from a storage position wherein the fourth end is adjacent the first rod and an extended position wherein the fourth end is spaced from the first rod. An attachment mechanism is mounted to the fourth end and a tool is removably mountable to the attachment mechanism. A release button is mounted to the hand gripper or the first rod and is movable to secure or release the vehicle hand tool from the storage position.

7 Claims, 4 Drawing Sheets

VEHICLE HAND TOOL

BACKGROUND OF THE INVENTION

Vehicle doors can be relatively heavy and cumbersome for those having limited manual dexterity and/or strength. Particularly, when a vehicle door is open, the door is often difficult for an individual to reach and close from within the vehicle without having to extend one's arm beyond, or substantially beyond the frame of the vehicle door. When a vehicle door is opened in inclement weather, e.g. in a heavy down pour, it would be useful and convenient to have a device for closing the door from within the vehicle without having to extend one's arm beyond the protective cover of the vehicle.

In addition, car maintenance, cleaning and upkeep often require retention of numerous tools within the vehicle, which often take up a large amount of space in a car or other vehicle. It would be convenient to construct a hand tool for a vehicle that is collapsible into a storage position that is relatively compact and is extendable into a working position to perform additional vehicle maintenance tasks that typically require a significant reach It would be convenient and desirable for a vehicle owner to have one tool that is able to perform all such functions to aid in closing and/or opening a door that is adaptable for cleaning and/or maintaining the vehicle as one vehicle hand tool unit.

BRIEF SUMMARY OF THE INVENTION

Briefly stated, the present invention is directed to a vehicle hand tool for opening and closing a vehicle door and performing various additional functions. The hand tool includes a hand gripper, a first rod, a second rod, an attachment mechanism mounted to a fourth end of the second rod and a tool removably mountable to the attachment mechanism. The first rod includes a first end and a second end, wherein the first end is fixed to the hand gripper. The second rod includes a third end and a fourth end and is movably mounted to the first rod. The second rod is movable from a storage position wherein the fourth end is positioned adjacent the first rod and an extended position wherein the fourth end is spaced from the first rod. A release button is mounted to the hand gripper or the first rod. The release button is movable to secure the second rod relative to the first rod in the storage position or to release the second rod from the storage position for movement relative to the first rod, typically to the extended position.

In another aspect, the present invention is directed to a method of closing an open vehicle door from a position within the vehicle utilizing a vehicle hand tool including a first rod having a first end and a second end. The second rod has a third end and a fourth end and a door pull tool is removably mountable to the fourth end of the second rod. The second rod is movable relative to the first rod between a storage position wherein the first rod is positioned adjacent the second rod and an extended position wherein the fourth end is spaced from the first rod. The method includes the steps of moving the second rod relative to the first rod from the storage position to the extended position, attaching the door pull tool to the fourth end of the second rod, grasping the vehicle hand tool proximate the first end of the first rod, maneuvering the vehicle hand tool such that the door pull tool engages a handle of a vehicle door, applying a pulling force on the handle through the hand tool to cause the vehicle door to move from the open position to a closed position, releasing the door pull tool from the handle, removing the door pull tool from the fourth end of the second rod, moving the second rod relative to the first rod from the extended position to the storage position and positioning the first and second rods and the door pull tool in a storage location

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
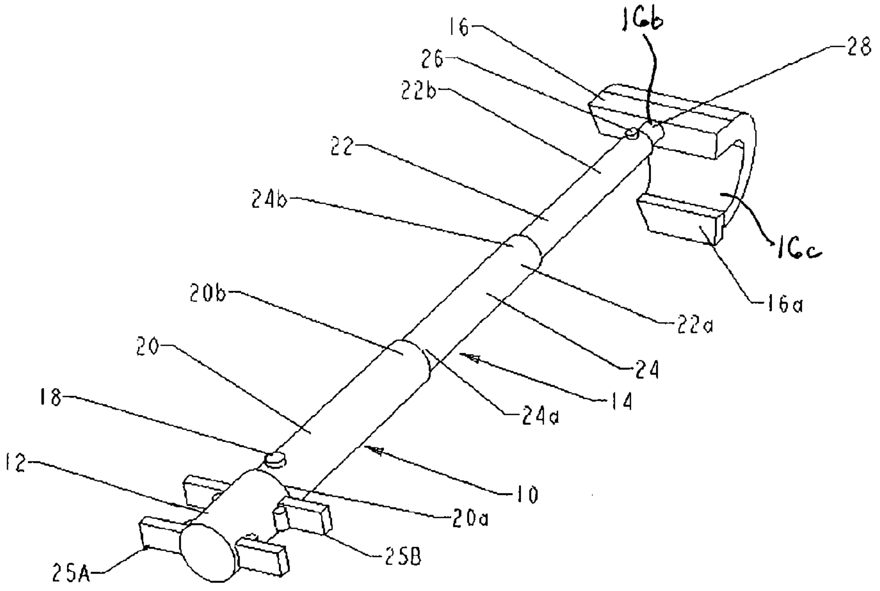
FIG. 1 is a top perspective view of a first preferred embodiment of the vehicle hand tool of the present invention.

Certain terminology is used in the following description for convenience only and is not limiting. The words, "right", "left", "lower", and "upper" designate directions in the drawings to which reference is made. The words "inwardly" and "outwardly" refer to directions toward and away from, respectively, the geometric center of the vehicle hand tool and designated parts thereof. The terminology uses the above-listed words, derivatives thereof and words of similar import.

Referring to the drawings in detail, wherein like numerals indicate like elements throughout, there is shown in FIGS. 1-4, first and second preferred embodiments of the vehicle hand tool, generally designated 10, 10', for opening or closing a car door or performing other tasks or functions related to a vehicle in accordance with the present invention. The features of the hand tool 10' of the second preferred embodiment are identified by like reference numerals for like features and a prime symbol (') to distinguish the second preferred embodiment. In addition, FIG. 5 shows preferred attachments of the vehicle hand tool 10, 10' of the first and second preferred embodiments.

Figure 2:
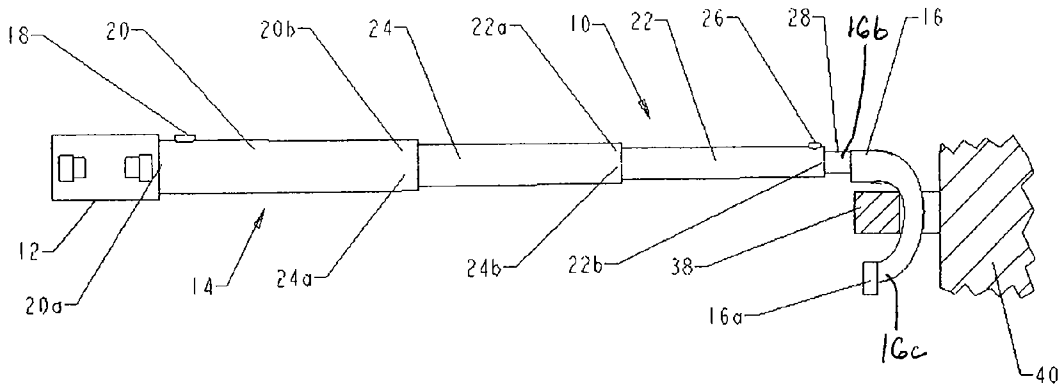
FIG. 2 is a right-side elevational view of the vehicle hand tool of FIG. 1 grasping a handle of a vehicle door.
Figure 3:
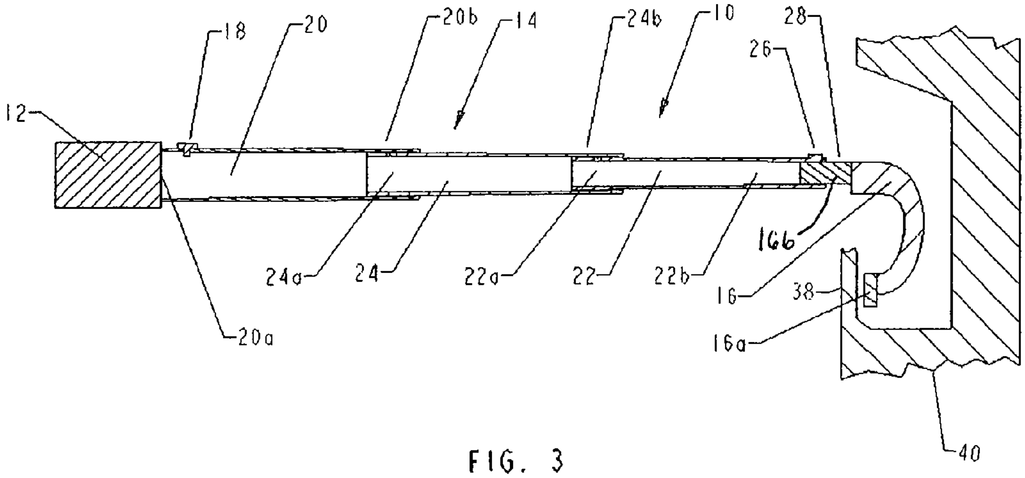
FIG. 3 is a cross-sectional view of the vehicle hand tool of FIG. 1, taken along line 3-3 of FIG. 1A and showing the vehicle hand tool grasping a molded compartment of a vehicle door frame.

Referring to FIGS. 1-3, in a first preferred embodiment, the hand tool 10 includes a hand gripper 12, an extendable rod 14 mounted to one end of the hand gripper 12, a door pull tool 16 removably mountable to an opposite end of the extendable rod 14 and a release button 18. The extendable rod 14 includes a first rod 20 mounted to the hand gripper 12 and second and third rods 22, 24 that are telescopically mounted to the first rod 20. The release button 18 is mounted to the hand gripper 12 or the first rod 20 and is movable or actuable to secure or release the second rod 22 for movement relative to the first rod 20. The first, second and third rods 20, 22, 24 are preferably hollow such that they may be telescopically mounted to each other, as will be understood by one having ordinary skill in the art. The first, second and third rods 20, 22, 24 permit the hand tool 10 to be moved between a storage position (not shown) and an extended position (FIGS. 1-3). The extendable rod 14 is preferably spring-loaded such that the second and third rods 22, 24 telescopically extend to the extended position from the storage position when the release button 18 is actuated. To move the second and third rods 22, 24 from the extended to the storage position, a user preferably urges the second and third rods 22, 24 toward the hand gripper 12 and the second and third rods 22, 24 are locked in the storage position by the release button 18 or a related mechanism.

The door pull tool 16 is not limited to being removably mountable to the extendable rod 14 and may be fixedly secured to the extendable rod 14. For example, the door pull tool 16 may be integrally molded to the extendable rod 14 or may be pivotably and permanently secured to the extendable rod 14. The door pull tool 16 may be secured to the extendable rod 14 using nearly any mounting technique as long as the door pull tool 16 is able to withstand the normal operating conditions of the vehicle hand tool 10 and perform the preferred functions of the door pull tool 16 for a particular application. In addition, the vehicle hand tool 10 may be comprised of an integrally molded hand gripper 12, second rod 22 and door pull tool 16, wherein the vehicle hand tool 10 does not move from the extended position to and/or from the storage position. Such a vehicle hand tool has a fixed length and may include an advertisement (not shown) secured thereto on the hand gripper 12, second rod 22 and/or door pull tool 16 to promote a specific product. For example, the advertisement may be integrally molded into the surface of the hand gripper 12, the second rod 22 or the door pull tool 16.

In the first preferred embodiment, the first rod 20 includes a first end 20*a* and a second end 20*b*. The first end 20*a* is preferably fixed to the hand gripper 12, thereby spacing the second end 20*b* from the hand gripper 12. The second rod 22 preferably includes a third end 22*a* and a fourth end 22*b*. In the storage position, the fourth end 22*b* is positioned adjacent the first rod 20 and in the extended position, the fourth end 22*b* is spaced from the first rod 20. Specifically, in the first preferred embodiment, the first end 20*a* is positioned proximate the third end 22*a* and the second end 20*b* is positioned proximate the fourth end 22*b* in the storage position. In the extended position, the second end 20*b* is positioned proximate the third end 22*a*. That is, the second end 20*b* is positioned closer to the third end 22*a* in the extended position than the first and fourth ends 20*a*, 22*b*.

In the first preferred embodiment, the third rod 24 is movably mounted between the first and second rods 20, 22. The third rod 24 includes a fifth end 24*a* and a sixth end 24*b*. The fifth end 24*a* is preferably positioned adjacent the second end 20*b* and the sixth end 24*b* is positioned adjacent the third end 22*a* in the extended position. The first, second and third rods 20, 22, 24 of the first preferred embodiment are preferably hollow with the first rod 20 having the largest diameter, the third rod 24 having the next largest diameter and the second rod having the smallest diameter such that the second rod 22 is slidably and telescopically positioned within the third rod 24 and the third rod 24 is slidably and telescopically positioned within the first rod 20. The extendable rod 14 is not limited to inclusion of the first, second and third rods 20, 22, 24 and may be comprised of a single rod or two rods that are extendable or movable relative to each other. However, the inclusion of at least the first and second rods 20, 22 are preferred such that the extendable rod 14 is movable between the extended position for increased reaching capacity and the storage position for creating a compact shape.

Figure 1A:
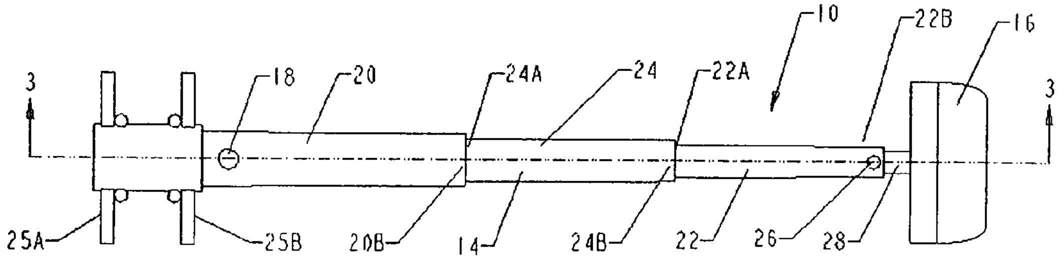
FIG. 1A is a top plan view of the vehicle hand tool of FIG. 1.

The hand tool 10 of the first preferred embodiment also includes at least one proximal flap 25A and at least one distal flap 25B. The at least one proximal and distal flaps 25A, 25B are preferably comprised of a pair of proximal flaps 25A and a pair of distal flaps 25B that are each pivotably mounted to the hand gripper 12 proximate proximal and distal ends of the hand gripper 12. The proximal and distal flaps 25A, 25B are preferably pivotable from an operating position (FIGS. 1, 1A and 2) wherein the proximal and distal flaps 25A, 25B extend generally perpendicularly from the hand gripper 12 and a folded position (not shown) wherein the proximal and distal flaps 25A, 25B are positioned against sides of the hand gripper 12 such that their longitudinal axis is generally parallel with a longitudinal axis of the hand gripper 12. In the folded position, the proximal and distal flaps 25A, 25B are generally compact for storage purposes. In the operating position, the proximal and distal flaps 25A, 25B may be gripped by an operator to aid in pushing and pulling on the hand tool 10 for improved utilization of the door pull tool 16. The hand tool 10 is not limited to inclusion of the proximal and distal flaps 25A, 25B or to the pivotable mounting of the proximal and distal flaps 25A, 25B to the hand gripper 12. The flaps 25A, 25B may be fixed in the operating position to the hand gripper 12 or may be excluded from the hand tool 10 without significantly impacting the operation of the hand tool 10, as would be understood by one having ordinary skill in the art. However, the inclusion of the pivotable proximal and distal flaps 25A, 25B is preferred to assist a user in operating the hand tool 10 and to provide additional gripping surfaces to provide leverage for the operator.

The hand tool 10 is not limited to inclusion of the telescopic extendable rod 14 including the first, second and third rods 20, 22, 24 or to inclusion of the release button 18. For example, the extendable rod 14 may include additional sections of rods or may be comprised of a single length rod (not shown). If the extendable rod 14 is constructed of a single rod, the release button 18 is typically not needed, as will be understood by one having ordinary skill in the art. However, it is preferred that the extendable rod 14 of the first preferred embodiment is comprised of the telescopic extendable rod 14 for extendability and ease of storage of the vehicle hand tool 10.

In the first preferred embodiment, the door pull tool 16 is releasably mountable to the fourth end 22*b* of the second rod 22 at a tool release or removable attachment mechanism 28. The door pull tool 16 preferably has a hook-shape or a U-shaped cross-section for grasping a handle 38 of a door 40 for closing and/or opening the door 40. The door pull tool 16 is preferably adaptable for opening a door 40 having an open-type handle 38 (FIG. 2) or an internally molded handle 38. The door pull tool 16 is also preferably adaptable for gripping a portion of the vehicle, not necessarily the door 40, to aid an individual in exiting the car. The door pull tool 16 preferably includes a mount end 16*b* and a distal end 16*c*. The mount end 16*b* is preferably removably mountable to the fourth end 22*b* of the second rod 22 at the attachment mechanism 28. The removable attachment mechanism 28 preferably locks the door pull tool 16 to the second rod 22 in the engaged position and permits release of the door pull tool 16, as desired by the user. The door pull attachment mechanism 28 is preferably free to rotate relative to and normal to the plane of the extendable rod 14 when closing or opening the vehicle door 40. The door pull tool 16 is preferably constructed of a generally rigid, structural material that is able to withstand the normal operating conditions of the door pull tool 16 and perform the typical operations of the door pull tool 16. For example, the door pull tool 16 may be constructed of a metallic, polymeric, wood or other like material.

The extendable rod 14 is preferably constructed of a rigid polymeric or metallic material, but is not so limited. The extendable rod 14 may be constructed of nearly any structural, generally rigid material that is able to withstand the normal operating conditions of the vehicle hand tool 10 and perform the typical functions of the extendable rod 14. For example, the extendable rod 14 may be constructed of nearly any polymeric, metallic, composite, wood or other like material.

Figure 4:
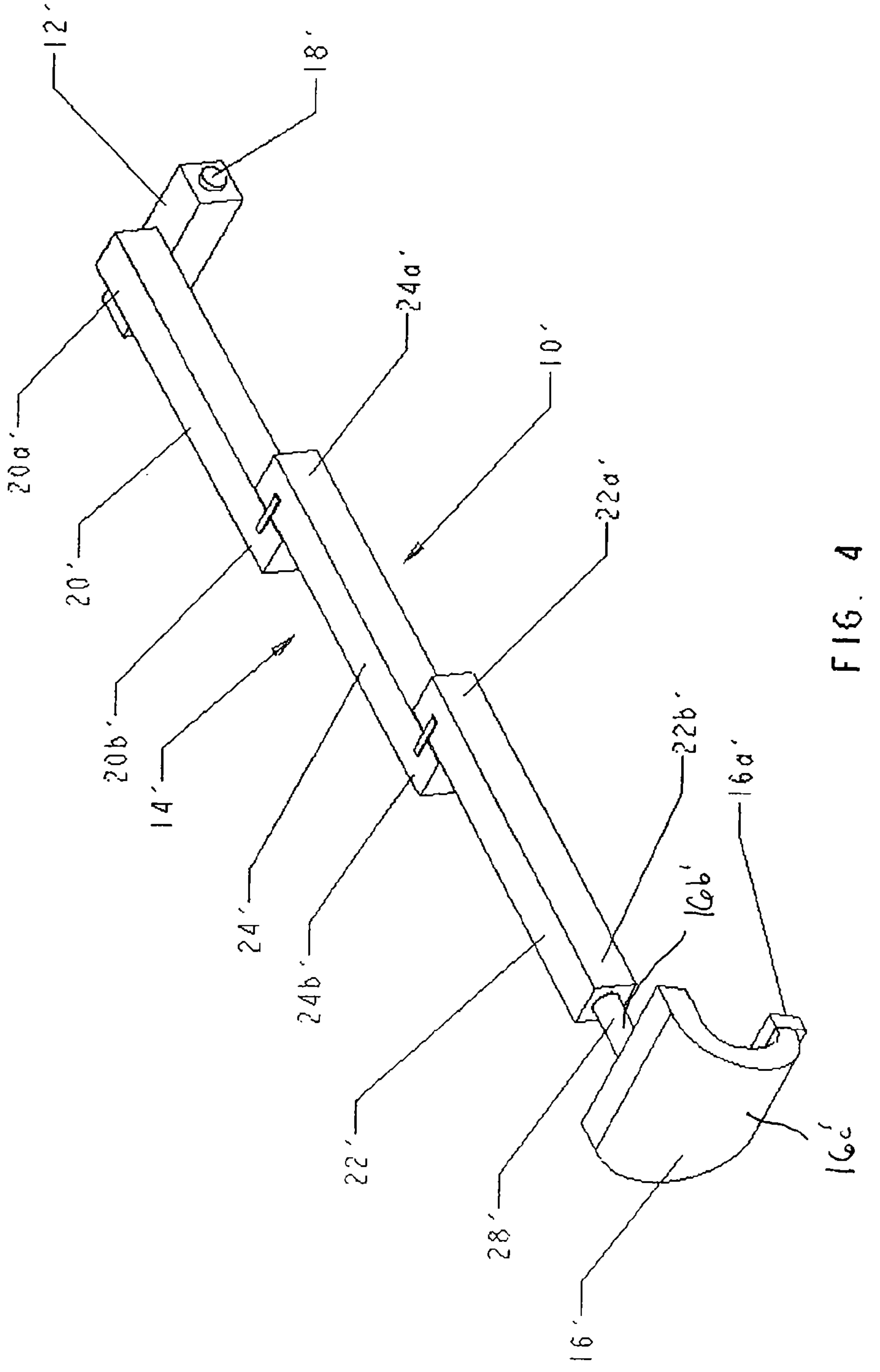
FIG. 4 is a top perspective view of a second preferred embodiment of the vehicle hand tool of the present invention.
Figure 5:
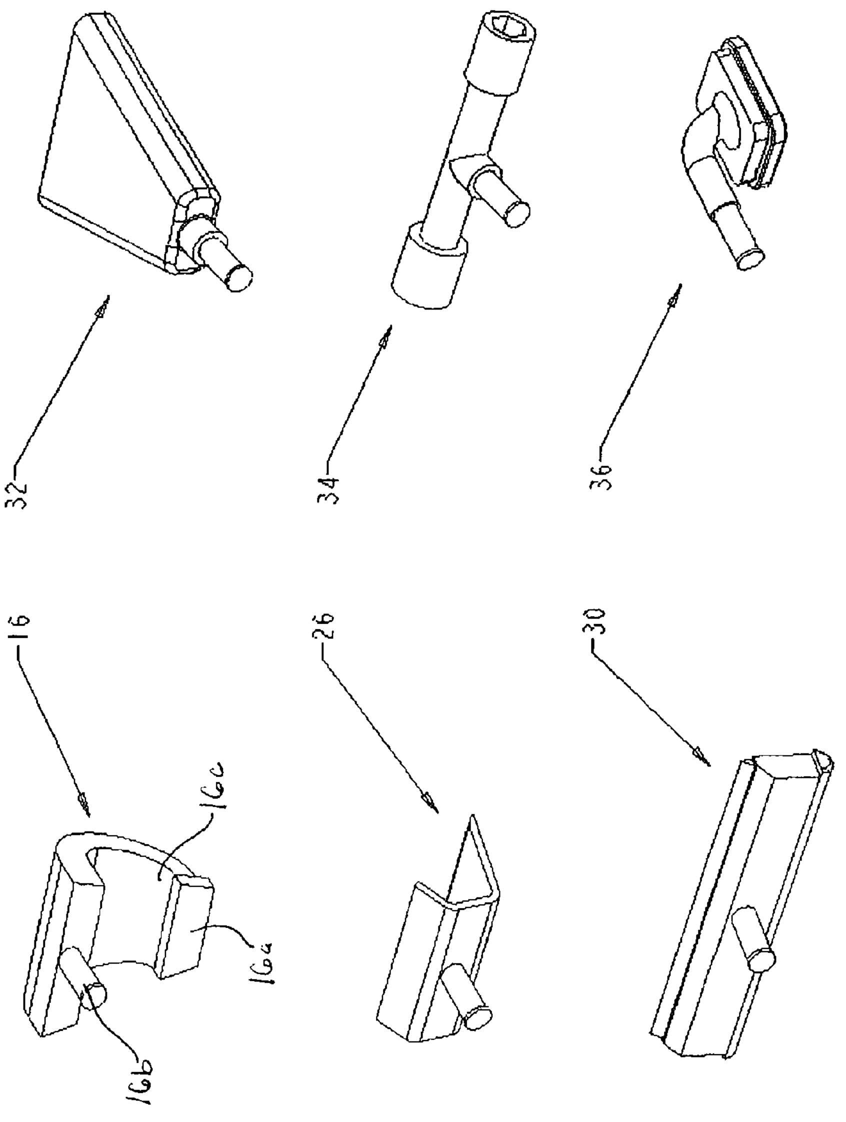
FIG. 5 is a top perspective view of several tools adaptable for use with the vehicle hand tool of the present invention.

Referring to FIG. 4, in a second preferred embodiment, the vehicle hand tool 10' includes the hand gripper 12', the extendable rod 14' and the door pull tool 16'. In the second preferred embodiment, the extendable rod 14' is constructed of first, second and third rods 20', 22', 24' that are generally solid and are foldable or pivotable relative to each other between the storage position and extended position (FIG. 4). In the second preferred embodiment, the fifth end 24*a*' is pivotably mounted to the second end 20*b*' of the first rod 20' and the sixth end 24*b*' is pivotably mounted to the third end 22*a*' of the second rod 22'. The first, second and third rods 20', 22', 24' are preferably foldable relative to each other to move from the storage to the extended position, as will be understood by one having ordinary skill in the art. In addition, the first, second and third rods 20', 22', 24' are preferably able to be releasably locked in the extended position, as will be understood by one having ordinary skill in the art.

Referring to FIGS. 1-5, in operation, the hand tool 10, 10' is preferably stored in a vehicle (not shown) in the storage position with or without the door pull tool 16, 16' or one of the alternative tools 26, 30, 32, 34, 36 (FIG. 5) mounted to the fourth end 22*b*, 22*b*' of the second rod 22, 22'. When a user intends to operate the vehicle hand tool 10, 10', the hand tool 10, 10' is removed from storage and the release button 18, 18' is depressed or is manually extended. The extendable rod 14, 14', preferably, automatically extends from the storage position to the extended position after the release button 18, 18' is depressed. If the door pull tool 16, 16' is not mounted to the fourth end 22*b*, 22*b*' of the second rod 22, 22', the door pull tool 16, 16' is mounted thereon, preferably by a snap fit. The proximal flaps 25A and the distal flaps 25B are pivoted from the folded to the operating position such that the user is provided with an additional structure for leverage when manipulating the vehicle hand tool 10, 10'. The user maneuvers the door pull tool 16, 16' using the hand gripper 12, 12' and flaps 25A, 25B, proximate the first end 20*a*, 20*a*', to grasp the handle 38 of the door 40 and pull the door 40 to a closed position. The door 40 is moved to the closed position by applying a force on the handle 38 through the vehicle hand tool 10, 10'. The proximal flap 25A may be specifically useful for providing additional leverage for the user to pull the door 40 to the closed position. The removable attachment mechanism 28, 28' preferably swivels relative to the fourth end 22*b*, 22*b*' of the second rod 22, 22' such that the door pull tool 16, 16' is able to easily grasp the door 40 as the door 40 pivots to a closed position, but is not limited to being pivotable relative to the second rod 22, 22'. The user may then move the hand tool 10, 10' from the extended position to the storage position, move the flaps 25A, 25B from the operating position to the folded position and place the hand tool 10, 10' back into storage.

In the preferred embodiments, the door pull tool 16, 16' may be released from the second rod 22, 22' prior to moving into the storage position. In the storage position, the release button 18, 18' preferably secures the first, second and third rods 20, 22, 24, 20', 22', 24' in the storage position and preferably must be actuated to release the rods 20, 22, 24, 20', 22', 24' to the extended position.

Referring to FIGS. 1 and 5, if the user wishes to use the hand tool 10, 10' for an alternative operation, the door pull tool 16, 16' may be released from the removable attachment mechanism 28, 28' and another tool 30, 32, 34, 36 may be mounted to the removable attachment mechanism 28, 28'. The alternative tools may be comprised of an ice scraper 26, a squeegee 30, a whisk broom 32, a lug wrench 34, a cleaning cloth 36 or other like tools that may be useful for a vehicle. The hand tool 10, 10' is not limited to the above-listed tools and may include nearly any tool that is able to be releasably mounted to the extendable rod 14, 14' by the removable attachment mechanism 28, 28' and would be helpful for a user of a car or other vehicle.

In the first preferred embodiment, the door pull tool 16 includes a rubberized tip 16*a* that permits a user to more securely grasp the door during use of the hand tool 10 and preferably minimizes scratching or denting of the handle 38 or door 40 during use of the vehicle hand tool 10. The elastic or rubberized tip 16*a* is preferably mounted to the distal end 16*c* of the door pull tool 16 and preferably limits sliding of the door pull tool 16 relative to the door as the user closes the door, preferably from a seated position within the car. The elastic tip 16*a* is preferably constructed of a polymeric material. The door pull tool 16 is not limited to inclusion of the elastic tip 16*a* constructed of a polymeric material and may include an alternative material for use at the rubberized tip 16*a*. For example, a claw for grasping the door or nearly any other mechanism or material that is able to generally prevent or limit slippage of the door pull tool 16 relative to the door 40 during use of the hand tool 10 may be mounted to the distal end 16*c* of the door pull tool 16.

The vehicle hand tool 10, 10' of the first and second preferred embodiments has a generally compact, hand-held configuration that extends from the storage position to the extended position for use.

In a third preferred embodiment (not shown) the hand tool may be pivotably mounted directly to the vehicle door such that it fits tightly in a storage position snug against the vehicle door in a storage position. The hand tool of the third preferred embodiment is preferably pivotably mounted to the door such that it is able to be pivotably extended to an extended position inwardly from an inside surface of the door for grasping by a user with minimum exertion and reach. The arm may be fixed in length or a variable, adjustable length determined by the user's preference. The arm may also have various lengths to provide a mechanical advantage for closing the vehicle door. The arm can be released and extended manually by the user when the door is opened or can be configured to extend automatically only when the door is opened.

The hand tool of the third preferred embodiment is pivotable between a rest position and an extended position and is secured to the door. When placed in its rest position, the extendable arm generally lies flat with the door trim or an inside surface of the door and does not interfere with a driver or passenger of the vehicle. The hand tool of the third preferred embodiment can be automatic to move the arm between the extended and rest positions, depending upon an angular position of the door. For example, the arm may automatically move to the extended position when the door is fully opened with respect to the vehicle. In addition, there may be a delay before the arm extends to the extended position to allow a passenger to enter the vehicle without obstruction from the extendable arm.

The hand tool of the third preferred embodiment may be made an integral part of the armrest or the door pull assembly with manual or automatic operation switch controls. The extendable arm may be actuated to an off position such that the arm does not extend from the door and constantly remains in the rest position, depending upon user preferences. The door pull assembly is preferably adaptable to all vehicle doors to facilitate closure by a driver or passenger.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of closing an open vehicle door from a position within the vehicle utilizing a vehicle hand tool including a first rod having a first end and a second end, a second rod having a third end and a fourth end and a door pull tool removably mountable to the fourth end of the second rod, the second rod being movable relative to the first rod between a storage position wherein the first rod is positioned adjacent the second rod and an extended position wherein the fourth end is spaced from the first rod, the method comprising the steps of:

a) moving the second rod relative to the first rod from the storage position to the extended position;

b) attaching the door pull tool to the fourth end of the second rod;

c) grasping the vehicle hand tool proximate the first end of the first rod;

d) maneuvering the vehicle hand tool such that the door pull tool engages a handle of a vehicle door;

e) applying a pulling force on the handle through the hand tool to cause the vehicle door to move from the open position to a closed position;

f) releasing the door pull tool from the handle;

g) removing the door pull tool from the fourth end of the second rod;

h) moving the second rod relative to the first rod from the extended position to the storage position; and i) positioning the door pull tool and the first and second rods in the storage position in a storage location.

2. The method of claim 1 wherein the vehicle hand tool includes a hand gripper and a release button mounted to one of the hand gripper and the first rod, the release button securing the first and second rods in the storage position in step (i) to prevent the second rod from moving to the extended position.

3. The method of claim 2 comprising the further step of:

j) actuating the release button prior to step (a) to release the second rod for movement relative to the first rod.

4. The method of claim 1 wherein the vehicle hand tool further includes a third rod, the first, second and third rods being generally cylindrical and hollow, the third rod being slidably mounted within the first rod and the second rod being slidably mounted within the third rod, the second and third rods telescopically moving relative to each other and the first rod from the storage position to the extended position in step (a).

5. The method of claim 1 wherein the vehicle hand tool further includes a third rod, the third rod being pitovably mounted to the first rod and the second rod being pivotably mounted to the third rod, the third rod pivoting relative to the first rod and the second rod pivoting relative to the third rod in step (a) when the vehicle hand tool moves from the storage position to the extended position.

6. The method of claim 1 wherein the door pull tool has a generally U-shaped cross section and an elastic tip, the elastic tip aiding the door pull tool in grasping the handle of the vehicle door in step (d).

7. The method of claim 1 comprising the further steps of:

c1) pivoting a pair of proximal and distal flaps from a folded position to an operating position following step (c); and e1) applying the pulling force in step (e) by grasping and pulling on at least one of the proximal and distal flaps.

* * * * *